No. 671,158. Patented Apr. 2, 1901.
A. BURMEISTER.
PIPE COUPLING.
(Application filed Oct. 12, 1900.)

(No Model.)

Witnesses:

Harry L. Clapp.

Inventor:
Alexis Burmeister

By his Attorneys.

UNITED STATES PATENT OFFICE.

ALEXIS BURMEISTER, OF FORT MADISON, IOWA, ASSIGNOR OF SEVEN-EIGHTHS TO JOSEPH OST, IRA B. LESH, FRED R. NAGEL, AND WALTER G. SMITH, OF SAME PLACE, AND CHARLES M. HEWITT, OF CHICAGO, ILLINOIS.

PIPE-COUPLING.

SPECIFICATION forming part of Letters Patent No. 671,158, dated April 2, 1901.

Application filed October 12, 1900. Serial No. 32,822. (No model.)

*To all whom it may concern:*

Be it known that I, ALEXIS BURMEISTER, a citizen of the United States, residing at Fort Madison, county of Lee and State of Iowa, have invented certain new and useful Improvements in Pipe-Couplings, of which the following is a specification.

My invention relates to improvements in couplings used to connect various kinds of air, steam, and water pipes, and is especially adapted to connect the extremities of flexible pipes such as are used to convey compressed air to various parts of a factory or machine-shop to operate pneumatic tools and the like.

It is the purpose of my invention to provide simple means for readily and firmly coupling the ends of pieces of flexible pipes and whereby the parts may be as readily uncoupled. The coupling consists of two counterpart members and are so constructed that either end of any piece of piping may be readily attached to either end of any other piece by placing the coupling members at the ends together and partially rotating them relatively to one another.

The preferred form which I have selected to illustrate my invention is illustrated in the accompanying drawings, set forth in the following description, and the invention is particularly pointed out in the claims at the end thereof.

Figure 1:
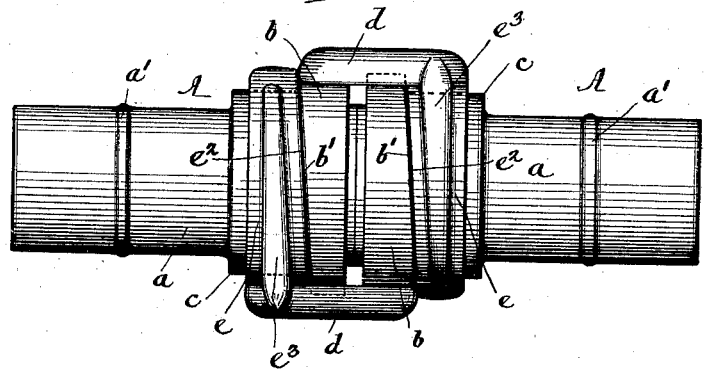
Figure 2:
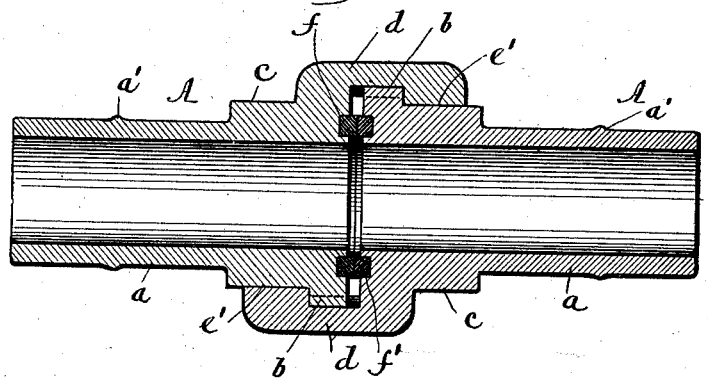
Figure 3:
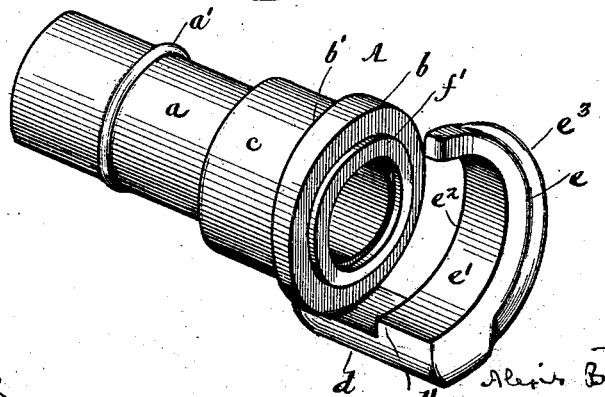

In the drawings, Figure 1 is a plan view of the two members of the coupling joined together. Fig. 2 is a longitudinal sectional view of the same, and Fig. 3 is a perspective view of one of the members of the coupling.

Each of the members A is provided with a reduced portion $a$, to which the ends of the flexible or other piping is secured in any suitable manner. This reduced portion is provided with the usual projection $a'$, which aids in forming a tight joint between the piping and the members of the coupling. The coupling members are also provided with a raised cylindrical cam-shoulder $b$ and the cylindrical body portion $c$. The inner face $b'$ of the cam-shoulder $b$ is slightly inclined, as shown, at an angle or pitch to the axis of the pipe, so as to form a cam-surface. Extending longitudinally from one point of the outer surface of the cam-shoulder $b$ is the interlocking lug $d$, provided at its end with a shoulder $d'$ and a laterally-extending curved horn $e$. The inner surface $e'$ of the horn $e$ and of the shoulder $d'$ is cylindrical and of about the same radius of curvature as and adapted to engage the cylindrical body portion $c$ of the opposing member when the parts are joined together. The inner edge $e^2$ of the horn $e$ and shoulder $e'$ is inclined, as shown, at the same angle or pitch as that of the surface $b'$ of the cam-shoulder $b$. The horn $e$ is also provided with a strengthening-rib $e^3$.

The abutting surfaces of the opposing members are provided with recesses $f$, in which are placed packing-gaskets $f'$, of rubber or other suitable material. It is readily seen that when the two members of the coupling are placed together, with the horn $e$ of each engaging the body portion $c$ of the other and the inclined cam-surfaces $b'$ and $e^2$ in engagement, a slight rotary movement will force and lock the two members firmly together to form, with the aid of the gaskets $f'$, a tight joint. The horns $e$ not only furnish extended cam-surfaces, but, as shown, extend about the opposing members and serve to strengthen the joint against lateral strain and displacement.

It will be observed that the coupling forms a rigid tight straightway joint free from obstructions and one which is readily coupled and uncoupled.

I do not wish to be confined to the details of construction herein set forth, which may be obviously varied by the skill of the mechanic without departing from the essentials of the invention.

Having described my invention, what I claim as new, and desire to secure by Letters Patent, is—

1. In a pipe-coupling, two counterpart members therefor, each having a cylindrical portion provided at its ends with a cylindrical cam-shoulder, having a helical inner face, and a longitudinally-projecting lug having an interlocking shoulder on its end, said shoulder having a cam-surface to correspond to that of said cam-shoulder, the interlocking shoulder of each member adapted to engage the cam-shoulder of the other member.

2. In a pipe-coupling, two counterpart members therefor, each having a cylindrical body portion provided at its end with a cylindrical cam-shoulder and a longitudinally-extending, interlocking lug, having at its end a laterally-extending curved supporting-horn, the lug and horn of each member adapted to engage the cam-shoulder of the other member.

3. In a pipe-coupling, two counterpart members therefor, each having a cylindrical body portion provided at its end with a cam-shoulder having a helical inner face, and a longitudinally-projecting lug mounted on the periphery of said cam-shoulder and having an interlocking shoulder on its end, said shoulder having a cam-surface to correspond to that of said cam-shoulder, the interlocking shoulder of each member arranged to engage the cam-shoulder of the other member.

4. In a pipe-coupling, two counterpart members therefor, each having a cylindrical body portion provided at its end with a cam-shoulder and a longitudinally-extending, interlocking lug mounted on the periphery of said cam-shoulder and having at its end a laterally-extending, curved supporting-horn, the lug and horn of each member adapted to engage the cam-shoulder of the other member.

5. In a pipe-coupling, two counterpart members therefor, each having a cylindrical body portion provided at its end with a cylindrical cam-shoulder, and a longitudinally-extending interlocking lug mounted on the periphery of said cylindrical cam-shoulder and having at its end a laterally-extending, semicircular, supporting-horn, the lug and horn of each member adapted to engage the cam-shoulder and the cylindrical body portion of the other member.

ALEXIS BURMEISTER.

Witnesses:
JOHN DOWNS,
C. F. WAHRER.